April 7, 1925.

H. A. TRESTER 1,532,277

CONTROL MECHANISM FOR MIXING MACHINES

Filed April 6, 1916

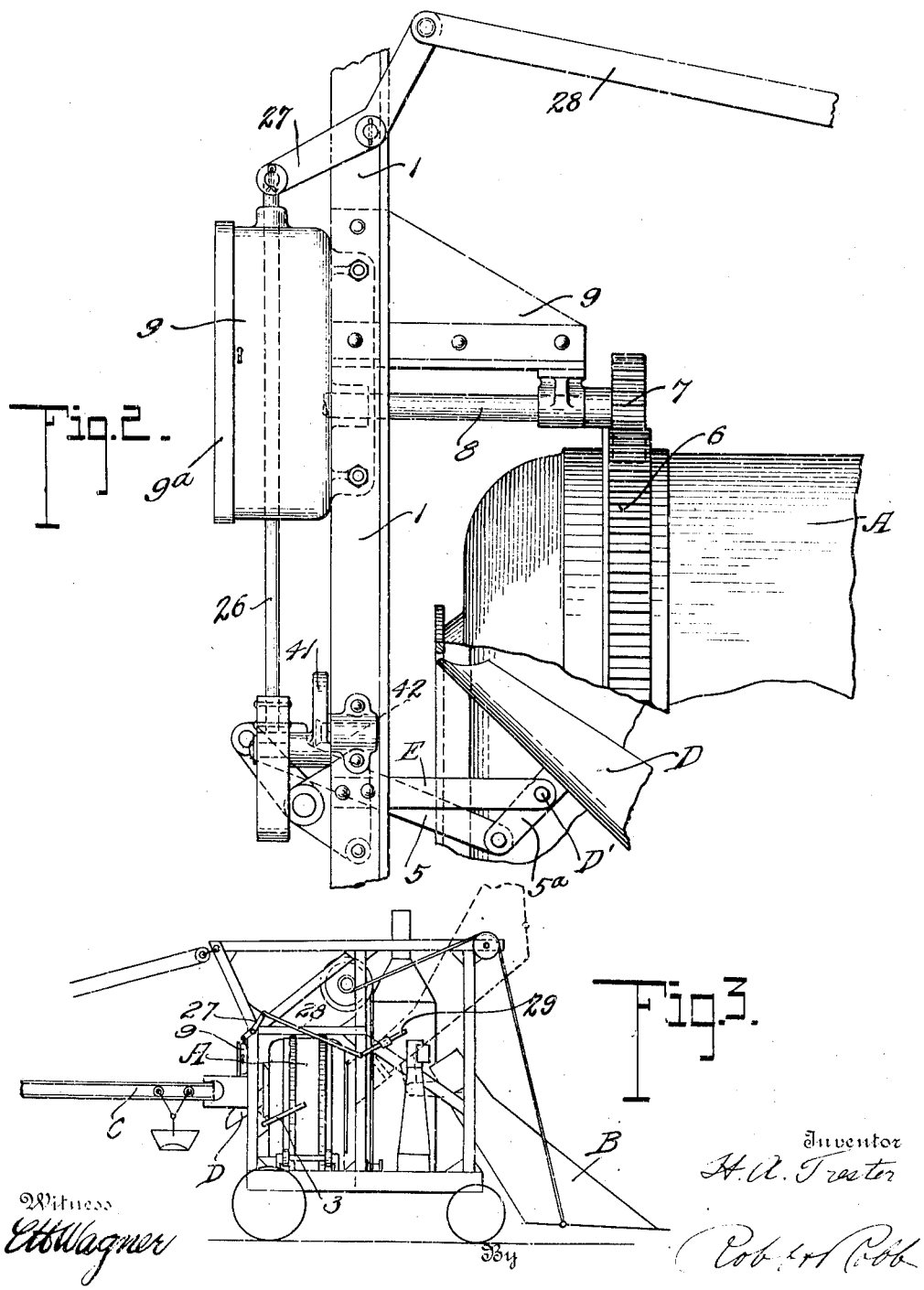

Patented Apr. 7, 1925.

1,532,277

UNITED STATES PATENT OFFICE.

HERAULT A. TRESTER, OF MILWAUKEE, WISCONSIN, ASSIGNOR, BY MESNE ASSIGNMENTS, TO KOEHRING COMPANY, OF MILWAUKEE, WISCONSIN, A CORPORATION OF WISCONSIN.

CONTROL MECHANISM FOR MIXING MACHINES.

Application filed April 6, 1916. Serial No. 89,312.

*To all whom it may concern:*

Be it known that I, HERAULT A. TRESTER, a citizen of the United States, residing at Milwaukee, in the county of Milwaukee and State of Wisconsin, have invented certain new and useful Improvements in Control Mechanism for Mixing Machines, of which the following is a specification.

This invention has to do with concrete mixing machines and embodies primarily control mechanism for such machines designed with a view to advising the operator when each mixing operation of the machine is completed.

The invention is particularly adapted to be applied to the type of mixing machines adapted for mixing batches of materials and in which it is essential for highest efficiency of operation that each batch of material with which the machine is charged shall be mixed a minimum period of time for complete and sufficient mixing operation, after which discharge of the mixed batch should be immediately effected and recharging of the machine attended to.

With the foregoing in view, therefore, the present invention involves broadly control means adapted to indicate the time of completion of the admixture of a batch of materials in the mixing machine, which means is directly controlled by the number of movements or revolutions of the mixing drum or mixer proper forming a part of the mixing machine. It is owing to the cooperation between the mixer or mixer drum proper and the control means of the invention that the proper mixture of the constitutents of a batch treated in the machine is absolutely insured.

A second essential and important feature of the invention resides in the provision of discharge means for the mixer adapted to be normally locked against operation until the mixture of the batch constituents is wholly completed, which lock means is likewise controlled to release the discharge means only when the required number of movements or revolutions of the mixer needed to render certain the proper completion of the mixing action have been performed.

Still another and important feature of the invention resides in the combination of batch completion indicating means with mixer speed indication means for peculiar cooperation to be hereinafter set forth, the above combination of parts employed in cooperation with a discharge means locking device, and all of said cooperative means utilized in conjunction with batch counting mechanism, including other and different combinative relations of these several features of the invention, all of which will appear more fully in connection with the aftergoing description and on reference to the accompanying drawings, wherein—

Figure 2 is a fragmentary side view showing the parts of the mixing machine illustrated in Figure 1 and the general arrangement of the control device and connecting parts when applied to the machine.

Figure 3 is a somewhat diagrammatic view of a conventional type of concrete mixing and distributing machine, and illustrating more fully the manner in which the control means is operated from the loading bucket.

Figure 1:
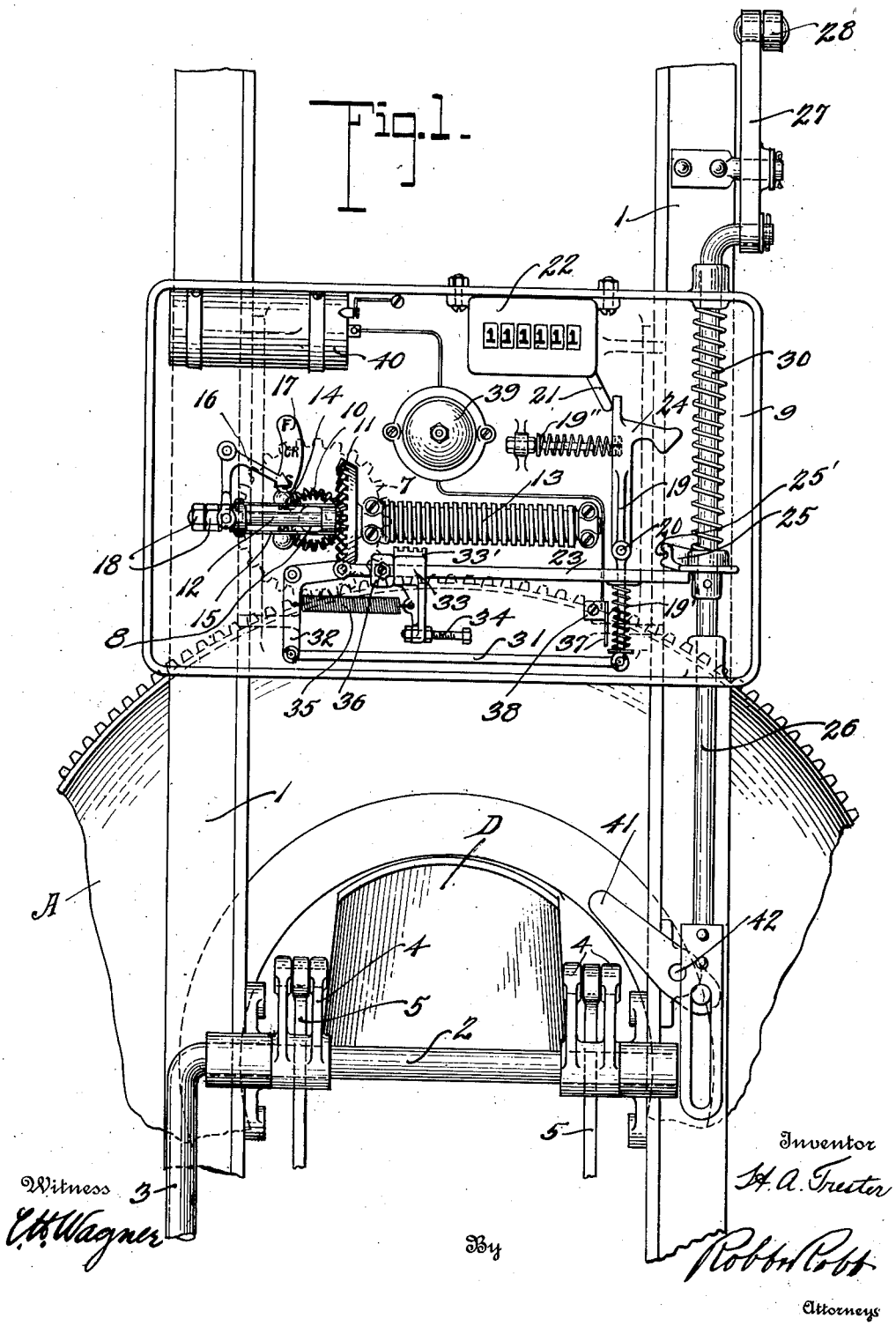
Figure 1 shows in end elevation a mixing machine equipped with the control means of this invention, the frame of the machine being broken away as well as the mixing drum, and the door of the casing enclosing the control devices being omitted for purposes of clear illustration.

Previous to describing the detail features of construction of the control means, reference is particularly made to Figure 1 in which a mixing machine of the ordinary Koehring type in common use is shown, and this machine includes a suitable truck and framework supporting the mixing drum A, the loading bucked B and having the distributing boom and bucket attachment as seen at C, the bucket of said attachment being adapted to receive mixed materials from the drum through the provision of a discharge chute D. The operator of the machine is able to control the operation of the loading bucket B and the distributing bucket of the boom attachment C by use of suitable operating mechanism and in the carrying out of the invention the bucket B is employed as an actuator for governing the action of the control means now to be set forth in detail.

Now referring to Figures 1 and 2, it will be observed that the discharge chute D is pivotally mounted at D' on the framework 1 of the mixer and operated by means of the shaft 2 having at one end the handle 3. Affixed to the shaft 2 are the rocker arms 4 with which are connected links 5 that lead to a supporting member 5ª to which the discharge chute D is attached and which supporting member is pivoted to bracket arms E extending into the drum A. The chute D is adapted to be tilted from a position inclining inwardly into the drum to a reverse position inclining downwardly and outwardly, in which latter position the contents of the drum may be discharged in the well known manner.

The drum A is of the gear driven type and one of its gear rings 6 is engaged with the drive pinion 7 of a drive shaft 8 suitably supported by a bracket 9 attached to the framework 1. The drive shaft 8 extends through the back of the casing 9 provided for the control mechanism, which casing 9 is supported in any suitable manner on the framework 1. Fixed to the shaft 8 and located within the casing 9 is the bevel gear 10 disposed so as to mesh with a corresponding but larger gear 11 which in turn is fixed to a governor shaft 12. The shaft 12 is supported in suitable bearings in the casing 9 and secured to rotate with the shaft 12 is the screw sleeve 13. A centrifugal governor is provided for the shaft 12 and comprises the balls 14 carried by the springs 15 attached to the shaft 12 and capable of being adjusted. The governor includes also an indicator 16 one arm of which constitutes a pointer cooperating with a dial section 17, the other arm directly cooperating with the parts 14 and 15 and being adjustable with said parts by means of the provision of the adjusting and lock nuts 18 carried by one end of the shaft 12.

From the foregoing it will be observed that the indicator 16 adapted to be viewed through a suitable transparency provided for the door 9ª of the casing 9 is adapted to advise the operator of the machine when the drum A is being driven at the correct R. P. M. whereby to effect proper mixing of the materials within said drum. Under such conditions the indicator 16 will point to the indicia "CR" on the dial section 17 and movement of the indicator toward the indicia "F" or the indicia "S" on said dial section will correspondingly advise the operator of the machine that the drum A is being driven too fast or too slowly, respectively.

"CR" stands for correct.

Associated with the governor shaft 12 and seen best in Figure 1 is a control lever 19 pivotally supported at 20 and having its upper end cooperative with the actuating lever 21 of the counter 22 located in the upper portion of the casing 9. The lower end of the lever 19 passes through a bar 23 beneath the screw 13 and said lever has a cam arm 24 extending laterally therefrom and in the path of a strip 25 carried by a vertically slidable rod 26 movable through the casing 9. The rod 26 is connected at its upper end with a lever 27 pivoted to the framework 1 and which lever is connected by a link 28 with a lever 29 adapted to be engaged and rocked so as to exert a pull on the link 28, each time the loading bucket B is upraised to charge the mixing drum A with a batch of materials for mixing purposes. The actuation of the parts 26, 27 and 28 by the loading bucket B results in an upward sliding movement of the rod 26 and lifting of the trip 25 until the latter engages the cam of the arm 24 thereby tilting the lever 19 inwardly at its upper end. This action causes the batch of material supplied to the drum A by the bucket B to be registered by the counter 22. The raising of the trip 25 as above described causes the compression of a spring 30 encircling the rod 26 above the trip, and furthermore causes the trip to be caught and held temporarily in its lifted position owing to the engagement of the arm 24 with the recess 25' of the trip 25.

The rocking of the lever 19 through the engagement of the parts 25 and 24 causes a pull to be exerted on a rod 31 pivotally connected at one end with the lower end of the lever 19 and similarly connected with a crank lever 32 adjacent to the gear 11. The upper arm of the crank lever 32 is pivotally connected with the adjacent end of the bar 23 previously mentioned, the opposite end of which bar is beneath and therefore in the path of movement of the trip 25. The bar 23 forms a track or support for a sliding knock-out member 33 formed with a thread section 33' adapted to engage the screw 13. The initial upward movement of the trip 25 raises said trip from the bar 23 and permits the outer end of said bar to be lifted slightly by a spring 19' encircling the lower end of the lever 19 and bearing against the under side of the bar 23. The subsequent upward movement of the trip 25 causing the rocking of the lever 19 and pull on the rod 31 rocks the crank lever 32 in such a manner that the bar 23 previously adjusted to an inclination is lifted at its inner end into parallelism with the screw 13 and the knock-out member 33 is thereby engaged at its threaded section 33' with the screw 13.

It being borne in mind that the screw 13 is constantly rotated with the governor shaft 12, immediately the member 33 is engaged with the screw 13 said member under the action of the screw is caused to move toward the lever 19. The member 33 is provided at its lower end with an adjustable arm 34 such that when the member 33 has been moved a predetermined distance the arm 34 will shift the lower end of the lever 19 outwards, thereby rocking the cam arm 24 from beneath the trip 25 and permitting the spring 30 to restore the trip and the rod 26 to the normal position shown in Figure 1.

The result of the downward restoring movement of the trip 25 is to cause the abutment of the trip 25 with the outer end of the bar 23, shifting said end downwards in an obvious manner. Furthermore, as soon as the trip 25 is disengaged from the member 24 a spring 19'' bearing against the rear side of the lever 19 rocks the latter outward at its upper end to restore said lever to its normal position, and this rocking movement exerts a push on the rod 31, and rocks the crank lever 32 in such a manner as to lower the inner end of the bar 23, thereby disengaging the knock-out member 33 from the screw 13. Immediately this disengagement of the parts 33 and 13 is effected, a coiled spring 35 connecting the parts 32 and 33 comes into play and pulls the knock-out member 33 to its normal position seen in Figure 1, said position being limited by the stop 36 fixed to the bar 23.

It will be apparent that by adjustment of the stop 36 the extent of movement of the knock-out member 33 may be controlled and this adjustment for varying the movement of the knockout member 33 is essential and important in order that the control mechanism just described may be adapted to control the mixing of different sized batches in the mixer to which it is applied, and in order that the control mechanism may be properly adjusted so that it may be used in connection with different sizes of mixers which of course have different capacities.

In other words, the knock-out member 33 controls virtually the time of mixing of each batch of materials with which the drum A is charged. Owing to the fact that the knock-out 33 is engaged with the governor screw 13 incident to the introduction of the batch into the drum A and the time during which the knock-out member is travelling through cooperation with the screw represents the minimum time required for proper admixture of said batch. It is owing to this condition that as an incident to the completion of the movement of the knockout member 33 the adjustable arm 34 is designed so as to strike a contact 37 carried by the block of insulation 38, which contact is connected by a circuit wire with the signal or bell 39 located in the casing 9. The bell 39 is wired to a battery 40 or other source of electrical current and the other terminal of the battery is grounded through the machine. Thus it is that the alarm or signal 39 is caused to sound at the end of the travel of the knock-out member 33, thereby advising the operator of the machine of the completion of the mixing of the batch, whereupon said operator by actuating the shaft 2 may discharge the batch from the drum A.

Subsequent operation of the loading bucket B causes lifting of the rod 26 and the cycle of operation of the various parts as previously described is obviously repeated each time a batch is introduced into the drum A through the use of the loading bucket B.

A relatively fine and accurate adjustment of the governor devices of the control mechanism is desirable so that the minimum time required for proper mixing of batches of materials fed to the drum A may be determined with exactness and the efficiency of the mixing machine for proper mixing as well as for doing a maximum amount of work is thus greatly subserved.

In order to insure against the discharge of the materials being mixed in the drum A previous to the operation of the signal 39 it is contemplated to provide a discharge chute locking member 41 pivoted to the framework 1 at 42 and connected with the lower end portion of the trip rod 26, as seen best in Figures 1 and 2. When the trip rod 26 is operated or lifted incident to the charging of the drum A by the bucket B the locking member 41 is shifted into the path of certain of the arms 4 on the discharge chute operating shaft 2 so that it is impossible for the operator to lift the handle 3 of said shaft to correspondingly actuate the links 5 for the purpose of tilting the chute D into discharge position, until the knock-out 33 has restored the trip 25 to normal, which is done, of course, practically simultaneously with the operation of the signal 39.

Having thus described the invention, what is claimed as new is:

1. In combination, a mixing machine comprising a rotary mixer, control means including governor mechanism operable by said mixer, indicating means to advise the operator of the time of completion of the mixing operation by said mixer, means to automatically actuate the indicating means from the governor mechanism, means for discharging the mixer, and means to prevent operation of the discharging means until after the indicating means has been operated.

2. In combination, a mixing machine comprising a rotary mixer, discharge means therefor, means to indicate completion of a mixing operation of said mixer, means to lock the discharge means, and means to automatically release the discharge means and to operate the indicating means after a predetermined number of revolutions of the mixer.

3. In combination, a mixing machine comprising a rotary mixer, control means including governor mechanism operable by said mixer, indicating means to advise the operator of the time of completion of the mixing operation by said mixer, means to actuate the indicating means from the governor mechanism, means for discharging the mixer, means to vary the action of the governor mechanism whereby to permit of application of the control means to different mixers, and means locking the discharge means and operable to release the same under the control of the governor mechanism.

4. In combination, a mixing machine comprising a movable mixer, discharge means therefor, means to indicate completion of a mixing operation of said mixer, means controlled by the movement of the mixer to operate the indicating means, and other means coacting with that last mentioned for indicating when the correct mixing speed of the mixer is being maintained.

5. In combination, a mixing machine comprising a rotary mixer, discharge means therefor, a correct mixing speed indicator operable by the mixer, and a batch completion indicator controlled from the speed indicator.

6. In combination, a mixing machine comprising a rotary mixer, discharge means therefor, a correct mixing speed indicator operable by the mixer, means to lock the discharge means against operation, and means to release said discharge means controlled from the speed indicator.

7. In combination, a mixing machine comprising a rotary mixer, control means including governor mechanism operable by said mixer, indicating means to advise the operator of the time of completion of the mixing operation by said mixer, means to control the indicating means from the governor mechanism, means for discharging the mixer, means to prevent operation of the discharging means until after the indicating means has been operated, a charging device for the mixer, and means to govern the action of the two means last mentioned from the said device.

8. In combination, a mixing machine comprising a rotary mixer, control means including governor mechanism operable by said mixer, indicating means to advise the operator of the time of completion of the mixing operation by said mixer, means to control the indicating means from the governor mechanism, means for discharging the mixer, means to prevent operation of the discharging means until after the indicating means has been operated, a charging device for the mixer, means to govern the action of the two means last mentioned from the said device, and a correct mixing speed indicator operable by said governor mechanism.

9. In combination, a mixing machine comprising a mixer discharging and charging means therefor, an indicator adapted to show when the mixer is operating, and not operating, at correct mixing speed, a train of gearing connecting said indicator with the mixer and comprising a constantly driven shaft, a batch completion indicator and controlling means operable from said shaft for controlling the action of said batch completion indicator.

10. In combination, a mixing machine comprising a rotary mixer, charging and discharging devices therefor, a batch completion indicator and controlling and operating means for said indicator including a shaft, gearing between said shaft and the mixer, a trip operable by the charging device to be moved into a predetermined position thereby, a holding lever having an arm to engage and maintain the trip temporarily in said predetermined position, and means operated from the shaft to actuate the holding lever to release the trip and incident to such actuation cause operation of the indicator.

11. In combination, a mixing machine comprising a rotary mixer, charging and discharging devices therefor, a batch completion indicator and controlling and operating means for said indicator including a shaft, gearing between said shaft and the mixer, a trip operable by the charging device to be moved into a predetermined position thereby, a holding lever having an arm to engage and maintain the trip temporarily in said predetermined position, and means operated from the shaft to actuate the holding lever to release the trip and incident to such actuation cause operation of the indicator, the last named means including a screw moving with said shaft, a spring retracted knockout member engageable and disengageable with respect to said screw under the control of the trip, and means for variably limiting the spring retracted movement of said knockout member.

12. In combination, a mixing machine comprising a mixer, discharging and charging devices therefor, a signal controlled by the charging device and operable by the mixer for indicating the minimum time required to complete a mixing operation of the mixer, and lock means for the discharging device releasable simultaneously with the operation of said signal.

13. In combination, a mixing machine comprising a mixer, discharging and charging devices therefor, means controlled by the charging device and operable by the mixer to govern the operation of the discharging device, a governor shaft, a screw thereon, a speed indicator controlled by said shaft, a trip rod operable by the charging device, a trip on said rod, a lever having an arm to engage and hold the trip in operated position, a knock-out member operable by said lever to engage and be operated by said screw, and to shift the lever to restore same and release the trip from said arm, a batch completion signal operable by the knock-out member, means to cause the trip to disengage the said member from the screw when the lever is restored by said member, a locking member for the discharging device operable by the trip rod, and drive means intermediate the mixer and the governor shaft.

In testimony whereof I affix my signature.

HERAULT A. TRESTER.